(12) United States Patent
Titus et al.

(10) Patent No.: US 12,005,970 B2
(45) Date of Patent: Jun. 11, 2024

(54) AERODYNAMIC DEPLOYABLE DIVE PLANES

(71) Applicant: Ford Global Technologies, LLC, Dearborn, MI (US)

(72) Inventors: Matthew Titus, Livonia, MI (US); Brett Peters, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 17/544,187

(22) Filed: Dec. 7, 2021

(65) Prior Publication Data

US 2023/0174172 A1    Jun. 8, 2023

(51) Int. Cl.
*B62D 37/02*         (2006.01)

(52) U.S. Cl.
CPC .................................... *B62D 37/02* (2013.01)

(58) Field of Classification Search
CPC .... B62D 37/02; B62D 35/008; B62D 35/005; Y02T 10/82
See application file for complete search history.

(56) References Cited

U.S. PATENT DOCUMENTS

| | | | |
|---|---|---|---|
| 8,308,222 B2 | 11/2012 | Ondracek | |
| 8,979,102 B1 * | 3/2015 | Prentice | B62D 25/186 280/124.1 |
| 9,994,267 B1 * | 6/2018 | Marmo | B62D 37/02 |
| 10,363,976 B2 | 7/2019 | Gaylard et al. | |
| 2018/0015968 A1 * | 1/2018 | Auden | B62D 37/02 |
| 2019/0047641 A1 | 2/2019 | Claywell et al. | |
| 2019/0092144 A1 * | 3/2019 | Cunningham | B60R 1/06 |
| 2020/0385070 A1 * | 12/2020 | Cattell | B62D 37/02 |
| 2020/0391881 A1 | 12/2020 | Elshrif et al. | |
| 2022/0371670 A1 * | 11/2022 | Titus | B62D 35/02 |

FOREIGN PATENT DOCUMENTS

DE   202018102006 U1 *  5/2018  ........... B62D 35/005

* cited by examiner

*Primary Examiner* — Lori Lyjak
(74) *Attorney, Agent, or Firm* — Burr & Forman LLP; Lorne Forsythe

(57) ABSTRACT

An aerodynamics control system for a vehicle may include a dive plane assembly operably coupled to a front portion of a vehicle body, an actuator assembly operable to transition the dive plane assembly between a deployed state and a retracted state, and a controller operably coupled to the actuator to provide automatic control of the dive plane assembly via the actuator based on a selectable control mode. The selectable control mode defines a position of the dive plane assembly based on vehicle parameters measured while driving the vehicle.

20 Claims, 13 Drawing Sheets

AERODYNAMIC DEPLOYABLE DIVE PLANES

TECHNICAL FIELD

Example embodiments generally relate to vehicle aerodynamics and, more particularly, relate to controllable aerodynamic dive planes.

BACKGROUND

Vehicles, and especially high performance vehicles, often employ aerodynamic devices that are designed to improve aerodynamic performance. These aerodynamic devices are typically static. Because these aerodynamic devices are static, they may provide improved performance over only a limited set of vehicle conditions.

Thus, it may be desirable to develop aerodynamic devices that addresses some of the shortcomings discussed above.

BRIEF SUMMARY OF SOME EXAMPLES

In accordance with an example embodiment, an aerodynamics control system for a vehicle may be provided. The system may include a dive plane assembly operably coupled to a front portion of a vehicle body, an actuator assembly operable to transition the dive plane assembly between a deployed state and a retracted state, and a controller operably coupled to the actuator to provide automatic control of the dive plane assembly via the actuator based on a selectable control mode. The selectable control mode defines a position of the dive plane assembly based on vehicle parameters measured while driving the vehicle.

In another example embodiment, a method of providing vehicle stability control to a vehicle having a dive plane assembly disposed on the vehicle may be provided. The method may include receiving status information from components or a sensor network of the vehicle while the vehicle is operating. The method may further include determining, via a selected control algorithm of a controller, whether to transition the dive plane assembly between a retracted state and a deployed state based on the status information, and operating an actuator operably coupled to the dive plane assembly to transition the dive plane assembly when the status information indicates that a deployment trigger or a retraction trigger is detected.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
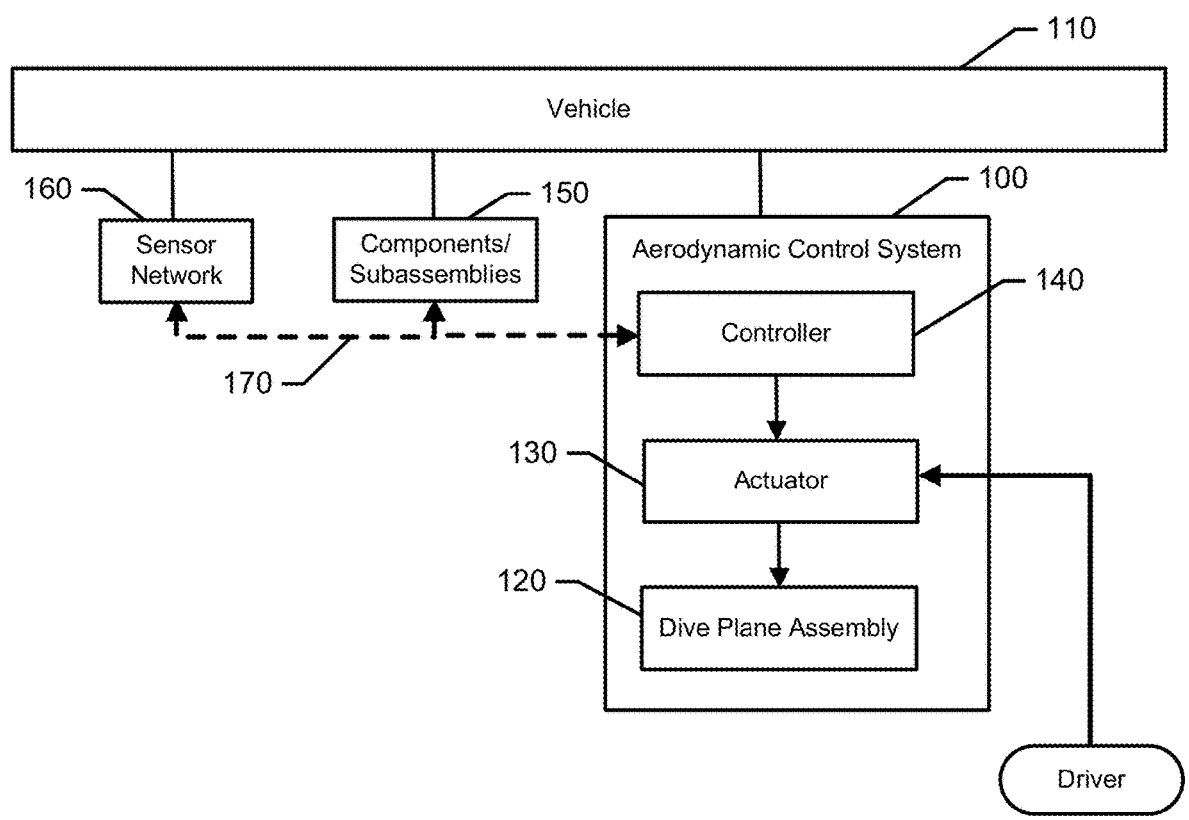
FIG. 1 illustrates a block diagram of a vehicle control system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some example embodiments may provide an improved system for aerodynamic control that includes deployable dive planes that are capable of being controlled to optimize drag, lift and other aerodynamic properties across various specific vehicle conditions. Given the physical location of the dive planes (e.g., at or proximate to front corners of the vehicle—some of which are class A surfaces), the use of deployable and controllable dive planes can yield benefits in both customer confidence and vehicle capability with less compromise. As a result, vehicle performance and driver satisfaction may also be improved.

FIG. 1 illustrates a block diagram of an aerodynamic control system 100 of an example embodiment. The components of the aerodynamic control system 100 may be incorporated into a vehicle 110 (e.g., via being operably coupled to a chassis of the vehicle 110 and/or electronic control systems of the vehicle 110). Of note, although the components of FIG. 1 may be connected to the chassis of the vehicle 110, it should be appreciated that such connection may be either direct or indirect. Moreover, some of the components of the aerodynamic control system 100 may be connected to the vehicle 110 via intermediate connections to other components either of the chassis or of other systems or components.

The aerodynamic control system 100 may include an aerodynamic device in the form of a dive plane assembly 120. The dive plane assembly 120 may include one or more individual dive planes (or air guide members) that are movable between deployed (i.e., extended) and retracted (i.e., withdrawn or not extended) positions as described herein in order to change the state of the dive plane assembly 120 based on various conditions or information pertaining to vehicle status, and based on driver or operator control. Moreover, although not required, the dive plane assembly 120 of some embodiments may be deployable partially so that something less than full extension of the individual dive planes may be accomplished. This partial deployment may also be actively controlled based on real time situational assessments or parameter measurements that are made while the vehicle is driven.

Thus, the dive plane assembly 120 of example embodiments may be both deployable and dynamic. The "deployable" nature of the dive plane assembly 120 relates to the fact that the dive planes of the dive plane assembly can be either deployed or retracted based on operator control. The "dynamic" nature of the dive plane assembly 120 refers to the fact that the dive plane assembly 120 is enabled to be dynamically repositioned responsive to real time conditions and status information to actively improve stability of the vehicle 110. Thus, for example, when the operator has deployed the dive plane assembly 120 (i.e., put the dive plane assembly 120 in the deployed state), the dive planes thereof may generally be deployed or extended. However, various changes in conditions or vehicle status may dynamically cause the retraction of the dive planes based on programmed rules or algorithms for control of the dive plane assembly 120. As noted above, both the deployment and the retraction of the dive planes can be partial in nature so that, for example, a specific desired angle of attack for the dive planes may be defined in some cases, and the angle of attack may be actively controlled based on current driving conditions.

In an example embodiment, the aerodynamic control system 100 may include a repositioning assembly (e.g., actuator 130), which may be provided as part of the aerodynamic control system 100 in order to reposition or move the dive plane assembly 120 under the control of a controller 140 (or control module) of the aerodynamic control system 100. In some cases, the controller 140 may be part of a vehicle dynamic module (VDM) or other control system of the vehicle 110 that is configured to perform other tasks related or not related to aerodynamic control or performance management. However, the controller 140 could be a dedicated or standalone controller in some cases. The operator (or driver) may either directly or indirectly control the actuator 130.

In an example embodiment, the controller 140 may receive information that is used to determine vehicle status (or environmental conditions) from or associated with various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

The components or subassemblies 150 may include, for example, a brake assembly and/or a wheel assembly of the vehicle 110. Sensors associated with the brake assembly may provide inputs such as brake pedal position, or brake pressure, to the controller 140. Sensors associated with the wheel assembly may provide information about vehicle speed, wheel angle, etc. Other sensors of the sensor network 160 that may be operably coupled to the brake assembly, the wheel assembly or other parts of the vehicle 110 may provide information relating to brake torque, brake torque rate, vehicle acceleration, individual wheel speeds/angles, etc. Other examples of the components or subassemblies 150 and/or corresponding sensors of the sensor network 160 may provide information relating to latitude/longitude acceleration, pitch, yaw, pitch rate, yaw rate, lateral G force, throttle position, aerodynamic load on the dive planes, selector button positions associated with chassis and/or vehicle control selections, etc. Thus, for example, the sensors may include an inclinometer, gyroscope, accelerometer, wheel angle, wheel angle request, brake torque, brake torque request, and/or the like. In some cases, the sensor network 160 may further include sensors for detecting weather conditions, road conditions or the like. For example, moisture sensors and temperature sensors may detect wet or icy roads. The sensor network 160 may also include a camera (or cameras) that operate in the visible light spectrum, infrared cameras, Lidar, and/or the like to detect debris or other obstacles or road conditions.

Accordingly, for example, the controller 140 may be able to receive numerous different parameters, indications and other information that may be related to or indicative of different situations or conditions associated with vehicle status. The controller 140 may then be configured to use the information received in association with the execution of one or more control algorithms that may be used to provide instructions to the actuator 130 in order to control a position of the dive plane assembly 120. Notably, although FIG. 1 shows the driver operating the actuator 130, it should be appreciated that such operation may be occurring indirectly via the controller 140. Moreover, although a single actuator 130 is shown in FIG. 1 to actuate the dive plane assembly 120 is should be appreciated that the actuator 130 may include multiple actuators associated with individual ones, pairs or other collections of dive planes that form the dive plane assembly 120.

Figure 2:
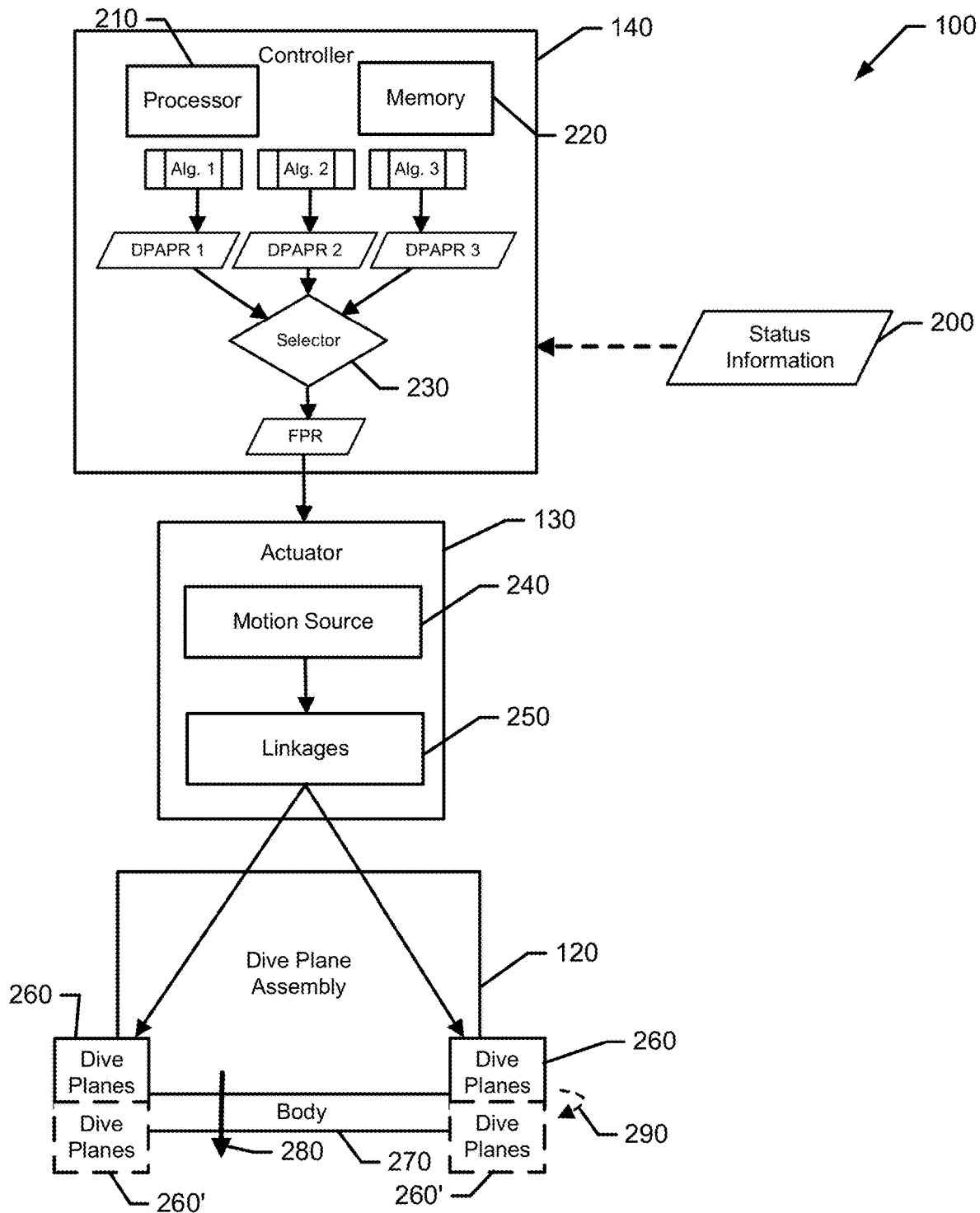
FIG. 2 illustrates a block diagram of some components of an aerodynamic control system of the vehicle control system of FIG. 1 in accordance with an example embodiment.

FIG. 2 illustrates a block diagram of various components of the aerodynamic control system 100 of one example embodiment in greater detail. In this regard, for example, the controller 140 may receive status information 200 (e.g., from the sensor network 160) via the vehicle communication bus 170. The status information 200 may include any or all of the types of information described above. Thus, for example, the status information 200 may include information regarding latitude/longitude acceleration, pitch, yaw, pitch rate, yaw rate, lateral G force, throttle position, wheel angle, wheel angle request, brake torque, brake torque request, aerodynamic load on the dive planes, selector button positions associated with chassis and/or vehicle control selections, etc.

Processing circuitry (e.g., a processor 210 and memory 220) at the controller 140 may process the status information 200 by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the status information 200.

The processor 210 may be configured to execute the control algorithms in series or in parallel. However, in an example embodiment, the processor 210 may be configured to execute multiple control algorithms either based on prior selection or in parallel (e.g., simultaneously). To either select which algorithm to use, or to resolve conflicts between parallel solutions, a selector 230 may be used to determine which control algorithm to employ if there are multiple different options to select between. For example, each control algorithm (e.g., Alg. 1, Alg. 2, and Alg 3 in FIG. 2) may be associated with a different mode, situation, or set of conditions. Alternatively, each of the control algorithms may be associated with a different driving style or strategy that the driver can select (e.g., via a driver interface) based on preference. In any case, a selected one or each of the control algorithms may be executed to determine a corresponding dive plane assembly position request (e.g., DPAPR 1, DPAPR 2, and DPAPR 3) that informs the actuator 130 where/how to position the dive plane assembly 120. In some embodiments, each individual one of the DPAPRs may have a corresponding table or set of tables for entry using any desired combination of the parameters provided as the status information 200 to get an output indicative of either whether to actuate the dive planes 260 to deploy them, or to a specific angle of attack at which the dive planes 260 are to be positioned for the parameters currently experienced by the vehicle 110. The processor 210 may have a speed and processing power sufficient to ensure that the status information 200 received via the vehicle communication bus 170 is both received and processed in real time (or near real time) to cause corresponding changes to be made to the actuator 130.

In some cases, one of the dive plane assembly position requests may be selected to be the final position request (FPR) that is communicated to the actuator 130. The selection may simply be based on which mode has been selected, and therefore which algorithm is used. However, in other cases, the processor 210 may further select a "best" DPAPR for a given situation from among all parallel calculations of possible DPAPRs. In other cases, the driver may be enabled to specifically select DPAPRs having names or titles that are indicative of the aggressiveness of the strategy employed or the specific driving conditions for which the corresponding DPAPR is most suited. Regardless of how one value is selected, the final position request may be provided to the actuator 130 to drive repositioning of the dive plane assembly 120 based on the status information 200 and the algorithm that processes the status information 200. The components of the actuator 130 may then physically move or operate to reposition the dive plane assembly 120. This repositioning could happen any suitable way, but one example is shown in FIG. 2.

In this regard, as shown in FIG. 2, the actuator 130 may include a motion source 240 (e.g., an electric motor, a hydraulic actuator, a pneumatic actuator, or the like) that is operably coupled to linkages 250 that are in turn operably coupled to dive planes 260 of the dive plane assembly 120. Thus, for example, the linkages 250 may include mechanical structures (e.g., hinges, links, arms, rods, etc.) that operably couple motion from an output of the motion source 240 to dive planes 260 (i.e., individual air guide members or elements) of the dive plane assembly 120.

In an example embodiment, the vehicle 110 may have a body 270, or other casing or physical structure having class A surfaces at corners or edges of the front end of the vehicle 110, at which location the dive planes 260 may be disposed. In an example embodiment, the dive planes 260 may be positioned proximate to the headlights of the vehicle 110 (e.g., below, above or alongside the headlights). The dive plane assembly 120 may enable the dive planes 260 to be moved with respect to the body 270 between deployed and retracted positions. In some cases, the dive planes 260 may rotate between retracted and deployed positions at which the dive planes 260 are proximate or adjacent to the body 270 and extended away from the body 270, respectively. Alternatively, the dive planes 260 may be moved linearly to extend out of the body 270 when extended and be withdrawn into the body 270 when retracted (e.g., either with a guillotine like motion in the direction of arrow 280 to extend linearly from a retracted position (shown by dive planes 260) to a deployed position (shown by extended dive planes 260'), or to extend pivotally (as shown by arrow 290) from the retracted position to the deployed or extended position. In other words, if the body 270 lies in an x-y plane, the dive planes 260 may move out of the x-y plane in the z direction (perpendicular to the x-y plane) to be repositioned to the deployed state. However, given the class A nature of the surface of the body 270 in some cases, exact perpendicularity may not be necessary or possible. It is only necessary that the surface area of the dive planes 260 be more exposed to aerodynamic loading in the deployed state.

In this example, the retracted position may correlate to a situation in which the dive planes 260 are fully withdrawn inside the shield 270. No part of the dive planes 260 may extend away from, past or outside of the body 270. Meanwhile, in the deployed position or state, the dive planes 260 may extend outside or away from the body 270 to a full extended length. As noted above, some embodiments may have only two positions (i.e., deployed and retracted), such that the motion source 240 and linkages 250 may effectively only move the dive planes 260 between two binary position choices. However, other example embodiments may have additional intermediate locations that could either be fixed or not. For unfixed intermediate locations, the dive planes 260 may be continuously movable to any location between full extension and full retraction.

Additionally, although the movement of extended dive planes 260' shown by arrow 280 could be linear and may be in line with either or both of the movement directions of the output of the motion source 240 and the linkages 250, other constructions and movements are also possible. For example, as noted above, it may alternatively be possible for the extended dive planes 260' to be retracted by folding to be adjacent to (or even flush with) the body 270. In this regard, for example, if the linkages 250 include hinges, the extended dive planes 260' may be folded for hinge-like movement as shown by dashed arrow 290 to lie in a plane substantially parallel to a plane in which the body 270 lies. Moreover, when in the retracted position, the dive planes 260 may be conformal with other (e.g., adjacent or neighboring) portions of the body 270. Thus, for example, the dive planes 260 could be either conformal with the body 270 or inserted inside the body 270 when in the retracted position.

Figure 3A:
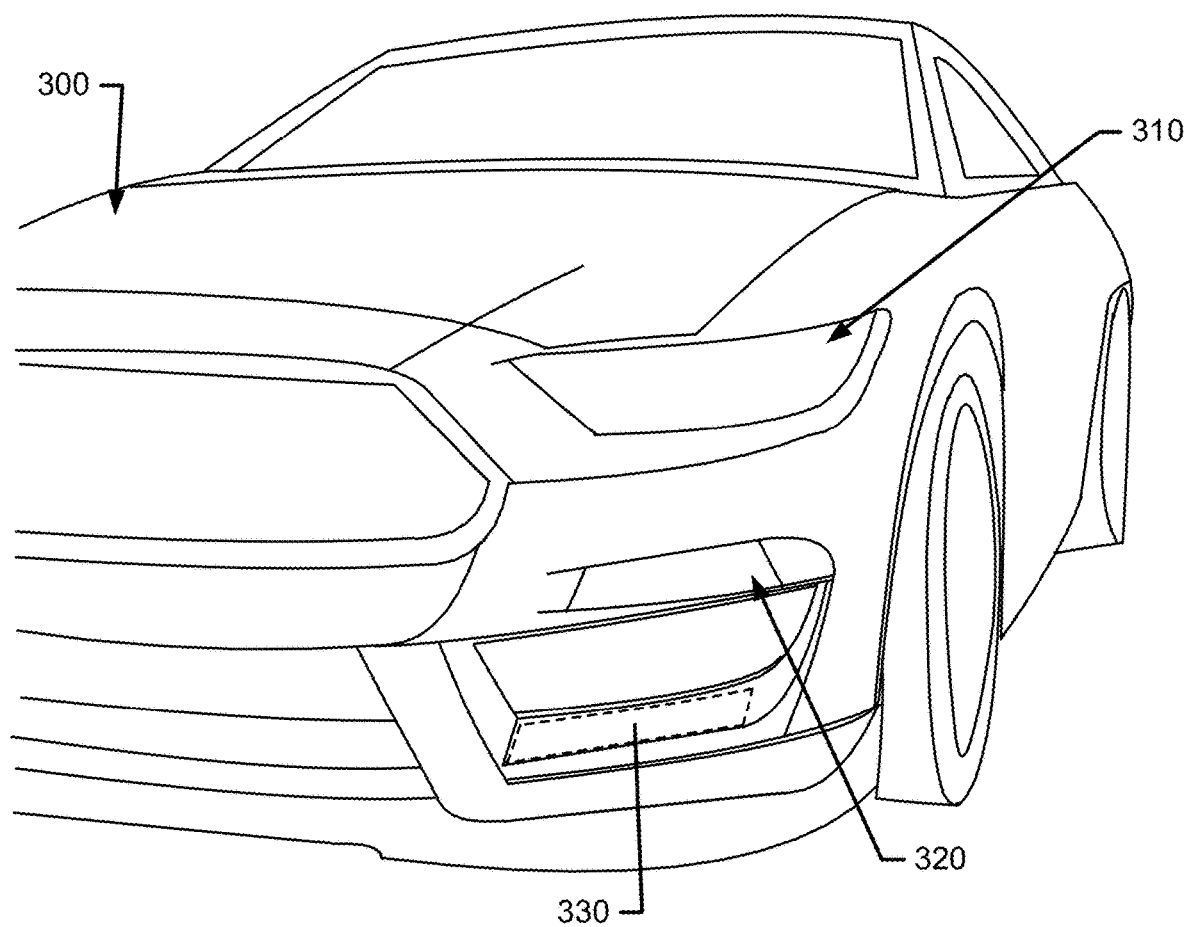
FIG. 3A illustrates a vehicle body with retracted dive planes in accordance with an example embodiment.
Figure 3B:
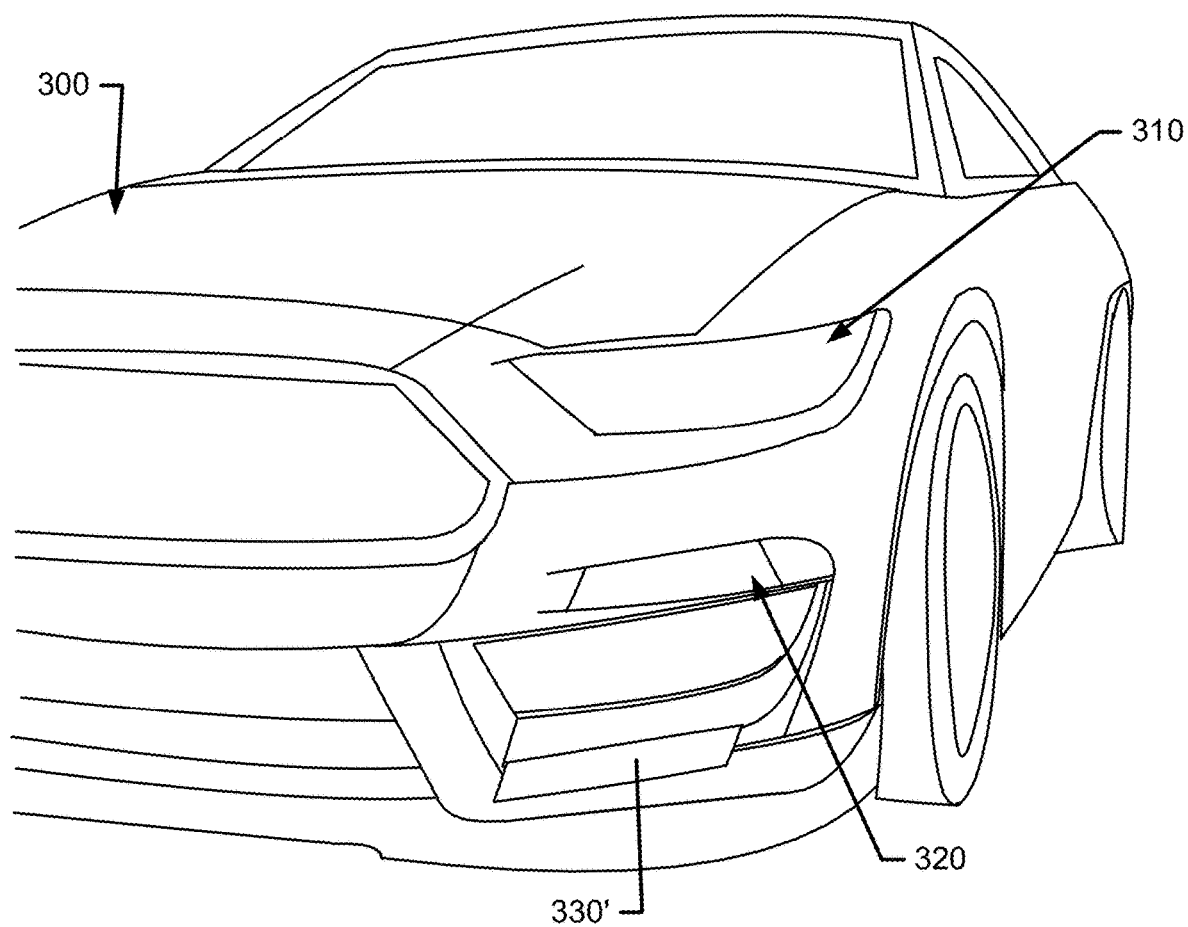
FIG. 3B illustrates the vehicle of FIG. 3A with dive planes extended in front of the vehicle in accordance with an example embodiment.

As noted above, the dive planes 260 may be either integrated into or attached to a class A surface at respective front corners of the body 270 of the vehicle 110. Moreover, in some cases, the class A surface may be proximate to the headlights or signal lights of the vehicle 110. FIG. 3A shows a vehicle body 300 with a headlight 310 and a signal light 320 and a dive plane 330 located at a front left corner of the body 300 below the signal light 320. Since the dive plane 330 may be conformal with the surface of the body 300 at this location, or may be inserted inside the body 330, the dive plane 330 is shown in dashed lines in FIG. 3A. FIG. 3B shows the dive plane 330' extended (and no longer dashed). In the example of FIGS. 3A and 3B, the dive plane 330 in the retracted position (FIG. 3A) is located substantially in a plane parallel to the ground surface, and when the dive plane 330' is extended (either linearly or via hinged rotation), the dive plane 330' moves to another location that is substantially parallel to the ground surface. However, as noted above, in some cases, the angle of the dive plane 330' when extended may be controlled (e.g., especially in the hinged case).

Figure 3C:
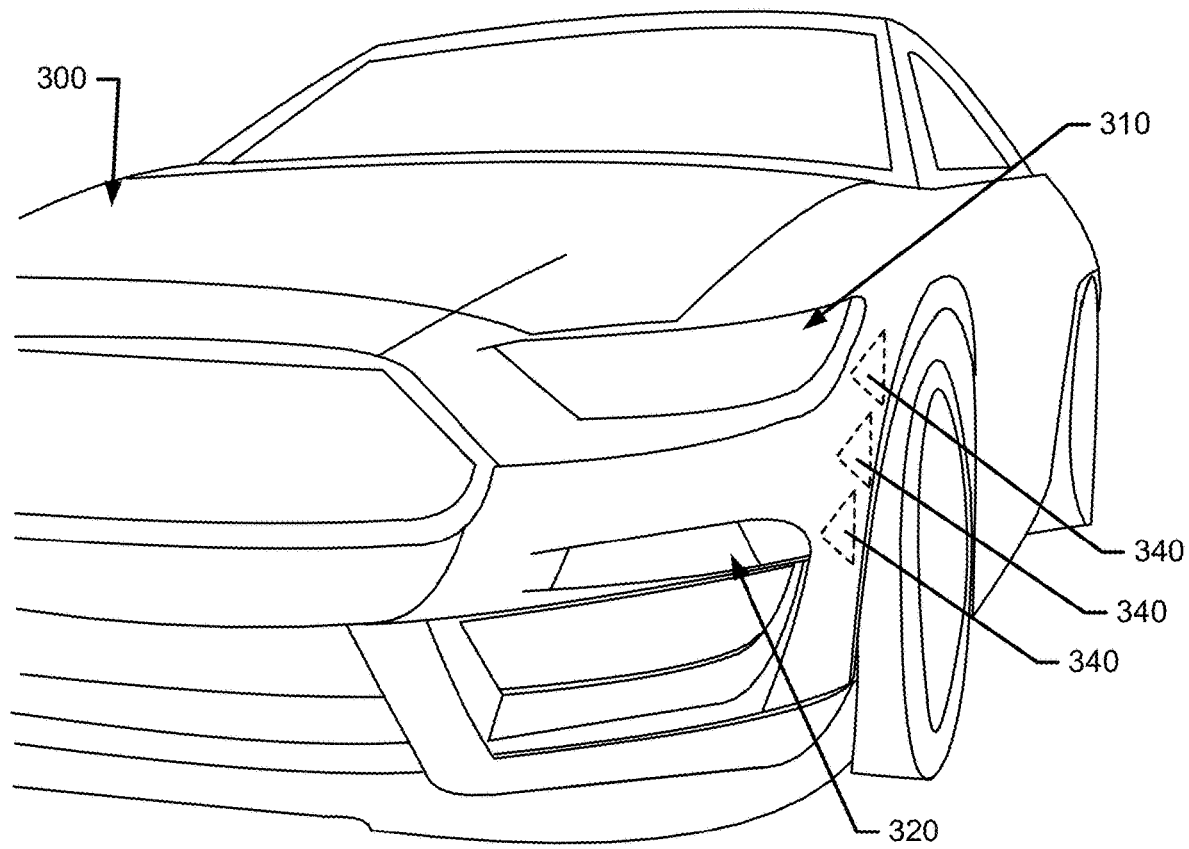
FIG. 3C illustrates a vehicle body with retracted dive planes in accordance with an example embodiment.
Figure 3D:
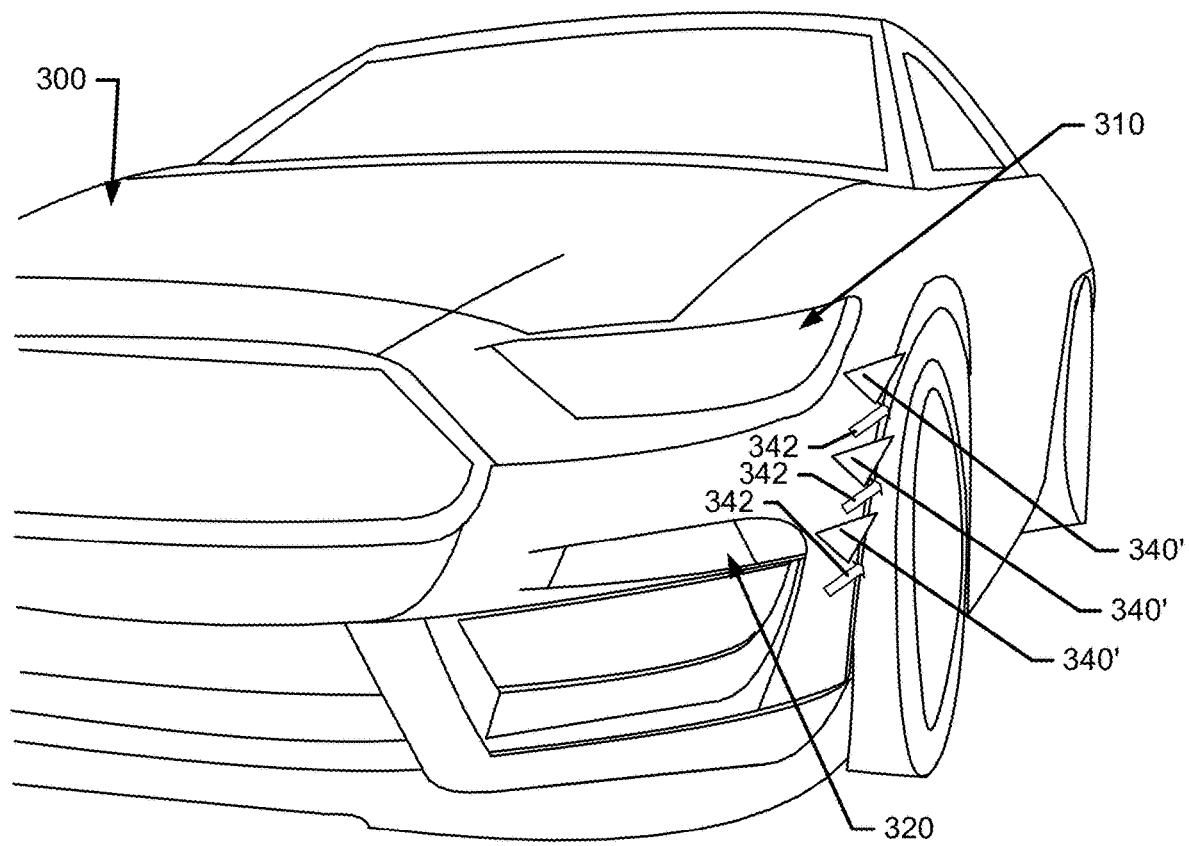
FIG. 3D illustrates the vehicle of FIG. 3C with dive planes extended to the side of the vehicle at a first angle of attack in accordance with an example embodiment.
Figure 3E:
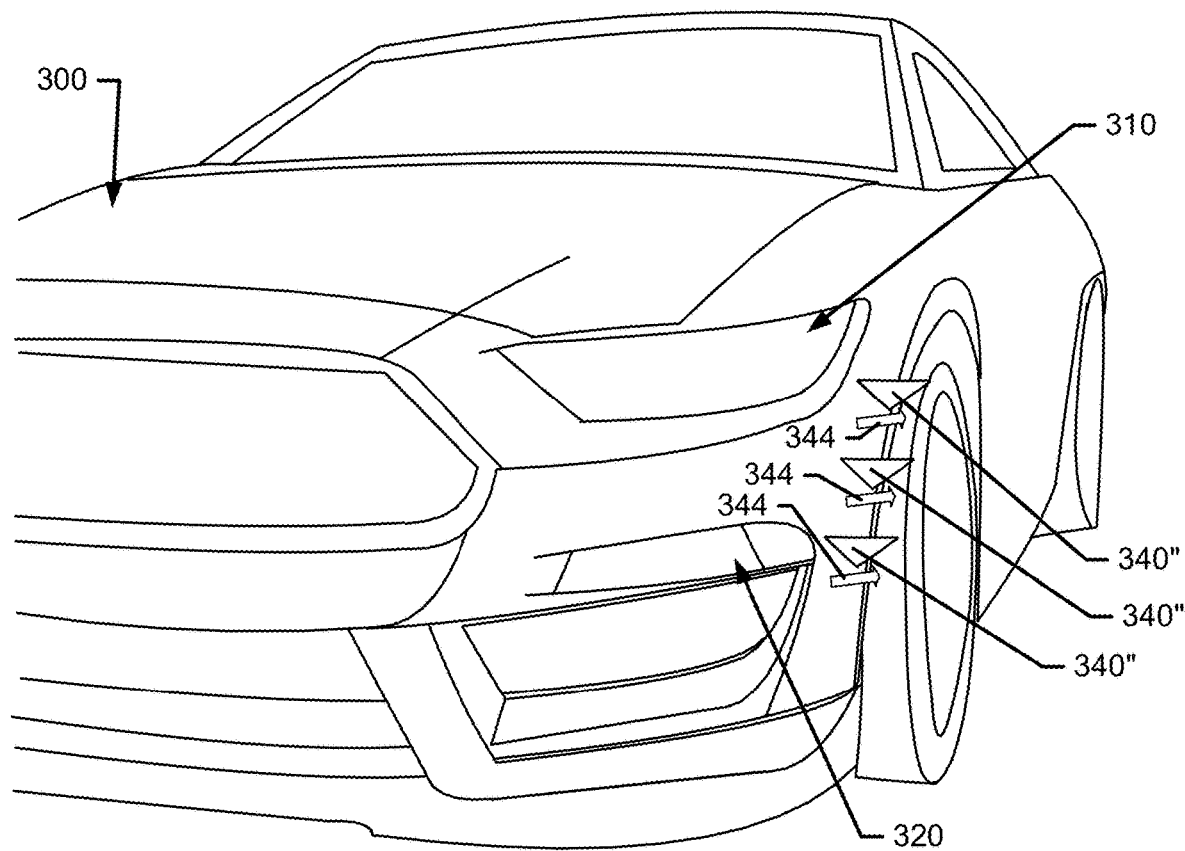
FIG. 3E illustrates the vehicle of FIG. 3C with dive planes extended to the side of the vehicle at a second angle of attack in accordance with an example embodiment.

FIG. 3C shows dive planes 340 in a retracted position on a side surface of the body 300 proximate to one or both of the headlight 310 and the signal light 320. In this example, the dive planes 340 are conformal with the body 300 in FIG. 3C when retracted, and are therefore shown in dashed lines. The dive planes 340 may be extended in this case via hinged rotation away from being conformal with the body 300. In FIG. 3D, the dive planes 340' are extended at a first angle to create redirection of airflow 342. Meanwhile, in FIG. 3E, the dive planes 340" are extended at a second angle to redirect airflow 344 differently than in FIG. 3D.

Thus, in some cases, the dive planes 260 (examples of which are shown in FIGS. 3B, 3D and 3D) are conformal with an x-y plane of the body 270 (regardless of how that plane corresponds to the ground) and deployed to cause the dive planes 260 to extend through or away from the body 270 in the z direction to provide redirection of airflow in the area of front corner(s) the body 270 or alongside the body 270. This redirection of airflow may, in some cases, be provided to only near a selected one the front wheels, based on turn direction, but could be provided to both, and will tend to add drag and reduce lift in each case. The addition of drag and/or reduction of lift, can be very desirable when braking or cornering in certain environments. However, for normal driving (e.g., either straight ahead or on the highway), these aerodynamic effects may actually increase emissions and/or reduce fuel economy. Accordingly, the discussion above of modes of operation may include modes for performance driving or track driving (e.g., where the dive planes 260 may be deployed), and other normal operating modes where the dive planes 260 may be retracted. That said, more nuanced or sophisticated modes or operational scenarios may also be desired in some cases.

Figure 4:
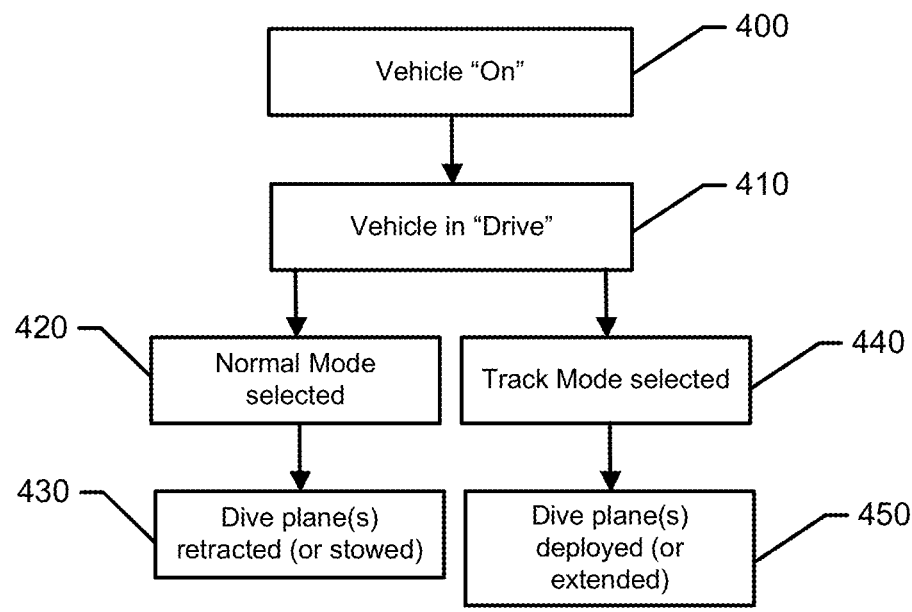
FIG. 4 illustrates a block diagram of one mode based control scheme in accordance with an example embodiment.

In this regard, for example, the selector 230 of FIG. 2 may have a normal mode and a track mode (among other possible modes). In the normal mode, the dive plane assembly 120 (and consequently the dive planes 260) may be in the retracted state. In the track mode, the dive plane assembly 120 (and consequently the dive planes 260) may be in the deployed state. An electrical, pneumatic or hydraulic motion source (e.g., actuator 130) is used to deploy the dive planes through vehicle network communications (e.g., CAN bus 170) and may retain the dive planes 260 in the state corresponding to each position for the entire time the corresponding mode is selected. FIG. 4 illustrates a block diagram of a flowchart showing a completely mode based deployment of the dive planes 260.

In this regard, as shown in FIG. 4, a basic flowchart for operation of an example embodiment may include an initial operation 400 that confirms that the vehicle is on. At operation 410, the fact that the vehicle is in a drive state is also confirmed. Thereafter, the selector 230 (or a similar mode selection component) may be placed in either a normal mode or a track mode. Notably, the particular naming convention used for the modes is not important, and the names "normal" and "track" are just examples. In any case, if the normal mode is determined to be selected at operation 420, then the dive planes are retracted (or stowed) at operation 430. If instead, the track mode was determined to be selected at operation 440, then the dive planes may be deployed (or extended) at operation 450.

Figure 5:
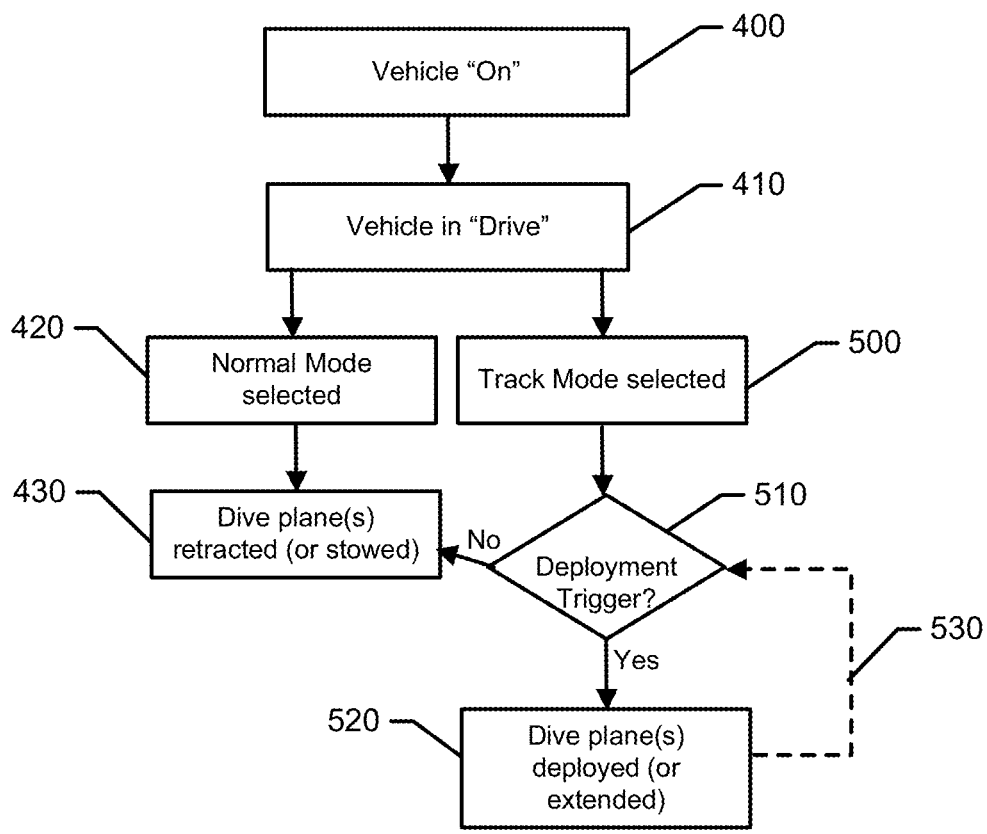
FIG. 5 illustrates a block diagram of a mode based control scheme with a normally retracted track mode in accordance with an example embodiment.
Figure 6:
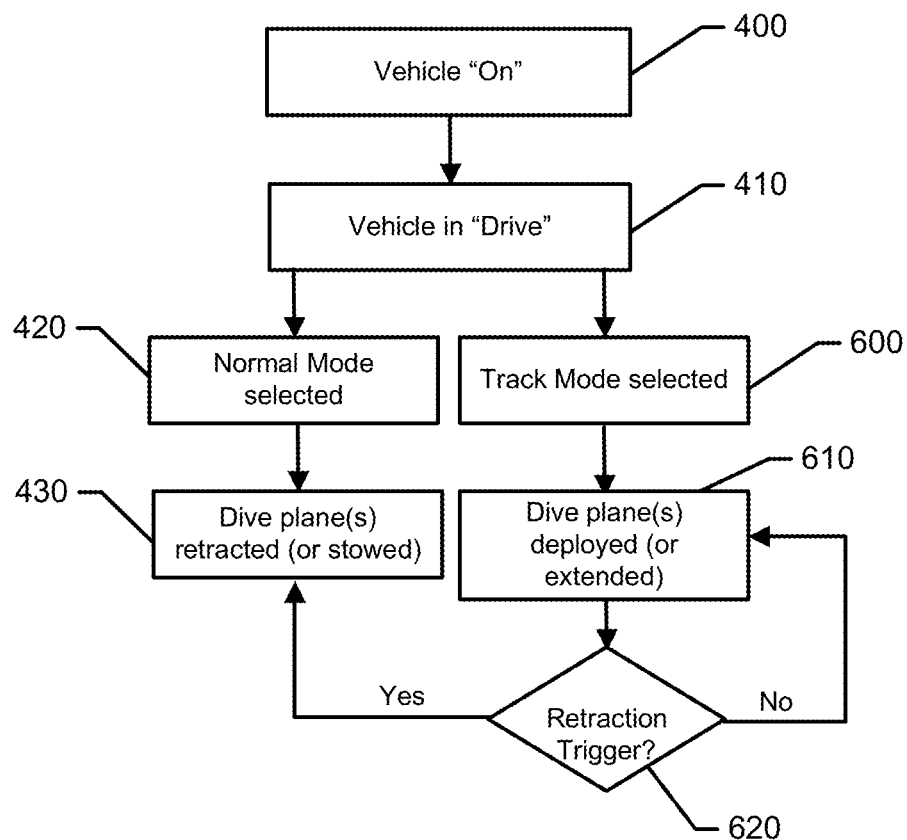
FIG. 6 illustrates a block diagram of a mode based control scheme with a normally deployed track mode in accordance with an example embodiment.

The simple example of FIG. 4 provides the driver with the ability to directly control the state of the dive planes based on the mode selection made. In this regard, in one selectable mode, the dive planes are deployed responsive to user selection to deploy the dive planes (by selecting the mode that corresponds to dive plane deployment). Meanwhile, in the other selectable mode, the dive planes are retracted responsive to user selection to retract the dive planes (by selecting the mode that corresponds to dive plane deployment). Thus, it should also be appreciated that the mode names could simply correlate directly to the dive plane condition such that, for example, the mode names could be "deployed" and "retracted". However, other names, and other and more sophisticated modes are also possible. FIGS. 5 and 6 illustrates some examples of more sophisticated modes.

In FIG. 5, the normal mode may operate the same as described above in reference to FIG. 4. Thus, a description of the normal mode will not be repeated here. However, the track mode may be different, and will thus be described in greater detail. In this regard, selection of the track mode at operation 500 of this example may initially cause no change in the deployment state of the dive planes. Instead, when in the track mode, the system (e.g., via controller 140) may detect current conditions or information (e.g., status information 200) that may be provided by the sensors of the sensor network 160. Based on the status information 200, the controller 140 of FIGS. 1 and 2 may determine whether a deployment trigger has been detected at operation 510. If the deployment trigger has been detected, then the dive planes may be deployed at operation 520. If no deployment trigger is detected, then the dive planes may remain retracted.

In some examples, the dive planes may only remain deployed while a deployment trigger (e.g., a condition for which deployment of the dive planes is desirable) is present. Thus, for example, a loop 530 (the optional nature of which is demonstrated by the fact that the loop is in dashed lines) may exist back to operation 510 for continued confirmation that the deployment trigger exists. Accordingly, when the deployment trigger is not present, the dive planes will be retracted (or stowed). The loop 530 could also include a timing element (e.g., a dwell time) such that after expiry of the dwell time, the dive planes are retracted. This may ensure that the dive planes are only ever deployed for a period not longer than the dwell time after any particular deployment trigger is detected. Of course, detection of additional or subsequent deployment triggers may extend the time period for deployment or cause re-deployment of the dive planes.

The trigger conditions could be conditions that correlate to any suitable situations or scenarios for deployment of the dive planes. Thus, within the context of the example of FIG. 5, the trigger conditions may be considered to be deployment triggers. As noted above, when the dive planes are deployed, increased amounts of energy are generated in the front corner area(s) of the vehicle 110, and the increased energy will lower pressure and increase downforces on the vehicle 110. This increases drag and reduces lift, which is not desirable for straight ahead driving (due to decreased fuel efficiency), but can be helpful for cornering or braking. Thus, the deployment triggers may include status information 200 that indicates active braking or turning. In some cases, if the status information 200 indicates a brake torque request greater than a threshold amount, the threshold amount of brake torque request may be considered to be a deployment trigger. Alternatively or additionally, wheel speed, wheel/steering angle, any brake request at certain speeds and/or angles, or various other indications of cornering and/or braking may be deployment triggers. In some cases, where the sensor network 160 includes cameras or location determination equipment (e.g., GPS sensors), the fact that a curve appears in the road ahead in a camera view, or via geo-fencing based on GPS position and corresponding knowledge of the road at the location of the vehicle, may be used as a deployment trigger. A yaw sensor may detect yaw that may also act as a deployment trigger.

The example of FIG. 5 defines a normally retracted dive plane paradigm, where deployment occurs when the driver has specifically selected for deployment of the dive planes and certain deployment triggers are met. However, a normally deployed strategy could alternatively be defined, as shown in the example of FIG. 6. In the normally deployed strategy, the dive planes may be deployed responsive to driver selection of the corresponding mode, and then may be retracted responsive to detection of retraction triggers as discussed in greater detail below.

Referring now to FIG. 6, the normal mode may operate the same as described above in reference to FIGS. 4 and 5. Thus, a description of the normal mode will not be repeated here. However, the track mode may be different, and will thus be described in greater detail. In this regard, selection of the track mode at operation 600 of this example may initially cause the dive planes to be deployed at operation 610. The dive planes may then stay deployed until a retraction trigger is detected. Thus, at operation 620, a decision may be made as to whether a retraction trigger is detected. If the retraction trigger is detected, the dive planes may be retracted at operation 430. However, for as long as not retraction trigger is detected, the dive planes may remain deployed at operation 610.

The trigger conditions for retraction could be conditions that correlate to any suitable situations or scenarios for retraction of the dive planes. Thus, within the context of the example of FIG. 6, the trigger conditions may include detection of high speed (straight away) driving with low wheel/steering angle. Geo-fencing or visual evidence of a straightaway ahead may also cause retraction along with timing related factors (e.g., the dwell time noted above). Geo-fencing considerations that may define retraction triggers may also include limitations related to off-road driving. For example, if the vehicle 110 is noted to have moved to a location indicating off-road driving, such location information may be seen as a retraction trigger. Cameras may also detect debris or other objects or obstructions for which retraction of the dive planes would appear to be advisable. Thus, object detection in the roadway may also serve as a retraction trigger.

In some example embodiments, temperature and/or moisture related information may also serve as retraction triggers. For example, water-weighting or ice accumulation may damage the dive planes, if deployed. Thus, if moisture is detected, and/or cold temperatures are detected, the detection of such phenomena may be retraction triggers. Aerodynamic loading on the dive planes may also be detected, and the dive planes may be retracted if such loading exceeds a threshold value. In other embodiments, a pitch sensor may detect high amounts of pitch as a retraction trigger. Of course, other retraction triggers may also be defined in alternative embodiments.

Figure 7:
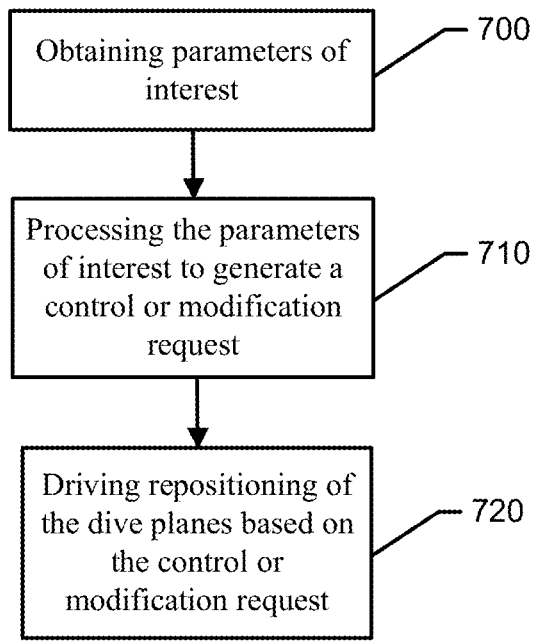
FIG. 7 illustrates a block diagram of a control method where an attack angle of the dive planes is variable in accordance with an example embodiment.

Although the examples above include deployment or retraction of dive planes based on corresponding triggers, it should be appreciate that such deployment or retraction may, in some cases, be performed partially or with specific control as to the angle of attack of the dive planes. In such cases, the deployment or retraction may be further controlled (e.g., by the controller 140 and based on a selected algorithm for control) based on the status information 200. FIG. 7 illustrates a flowchart of an example in which the degree of deployment or retraction is controllable.

As shown in FIG. 7, operation 700 may include obtaining parameters of interest. The parameters of interest may be those parameters from among the status information 200 that are applicable for use in the selected control algorithm (e.g., Alg. 1, Alg. 2, Alg. 3, etc., from FIG. 2). At operation 710, the selected control algorithm may process the parameters of interest to generate a control or modification request. At operation 720, the control or modification request may be used to drive the actuator 130 to reposition the dive planes (e.g., dive planes 260). The control or modification request may include a direction component and a speed component for repositioning of the dive planes. In some cases, the control or modification request may define a specific location or position for the dive planes. An error signal may exist until the current location or position of the dive planes matches the specific location or position of the dive planes, and movement may occur according to the direction component and the speed component until the error signal is reduced to zero (indicating that the dive planes have reached the specific location or position of the dive planes.

Figure 8:
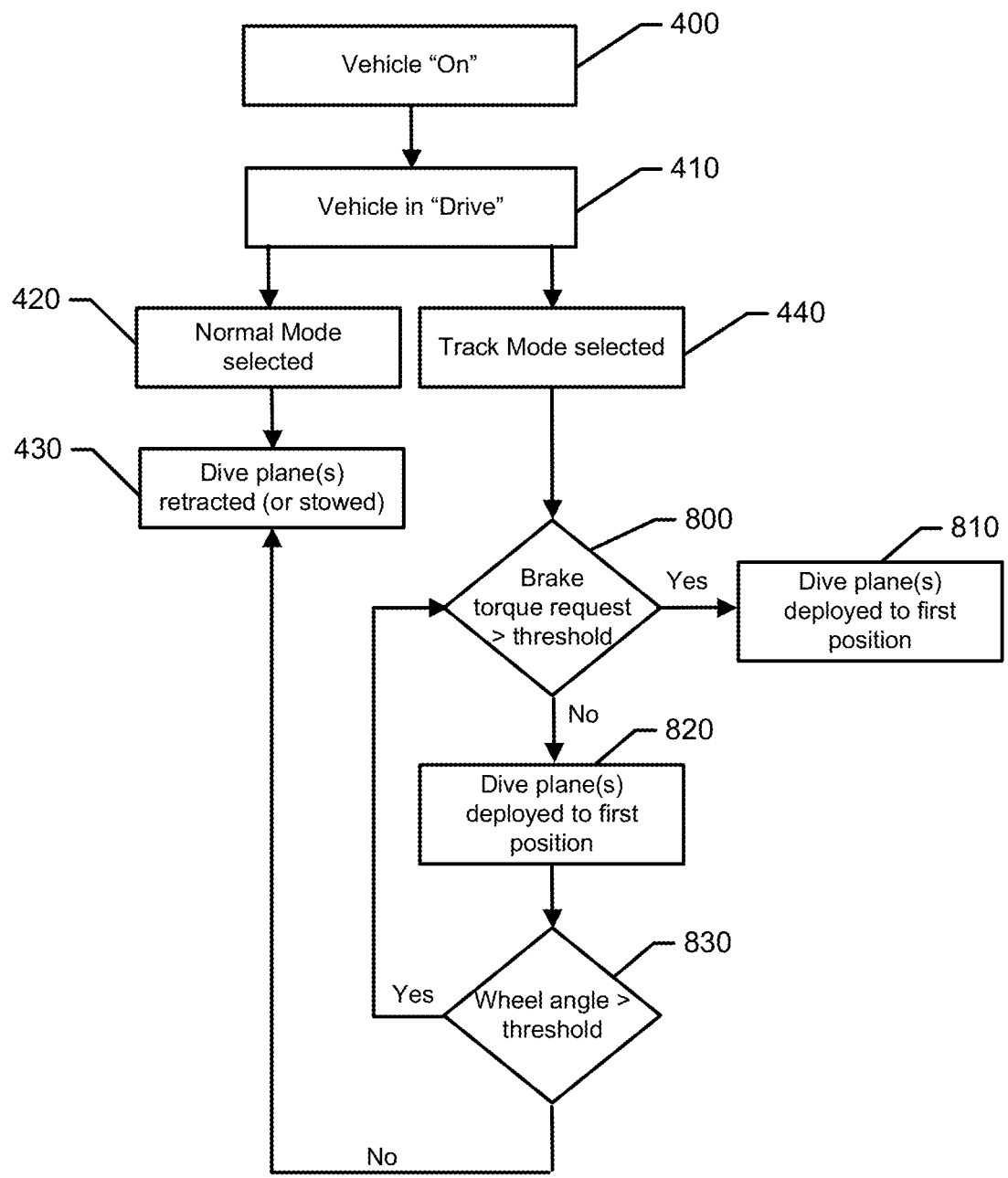
FIG. 8 illustrates a block diagram of a multi-factor application of a control algorithm to the control of dive planes in accordance with an example embodiment.

FIG. 8 illustrates a block diagram for a specific example embodiment in which the parameters used for control of the dive planes include a brake torque request (e.g., the amount of brake torque requested for application by the driver (e.g., via the brake pedal)) and wheel angle (i.e., steering wheel angle). As with FIGS. 5 and 6, operations 400 to 440 may be the same as those described in connection with FIG. 4. In this example, an initial determination is made regarding whether the brake torque request is about a threshold value at operation 800. If the brake torque request is above the threshold value, then dive planes may be deployed to a first position at operation 810. In some cases, the first position could simply be to the deployed position (e.g., fully deployed or to a first deployment position (i.e., a first angle of attack)). In an example embodiment, the value of the first angle of attack may be determined based on other parameters such as vehicle speed, wheel speed, or any of the other parameters listed above as possible components of the status information 200 in addition to the brake torque request. However, in others, the first angle of attack may instead by determined only based on the brake torque request.

If the brake torque request is not above the threshold value at operation 800, then the dive planes may be deployed to a second position at operation 820. Similar to the first position, the second position may be a second deployment position that corresponds to a second angle of attack. In some cases, the value of the second angle of attack may be determined based on other parameters such as vehicle speed, wheel speed, or any of the other parameters listed above as possible components of the status information 200. Thereafter, a determination may be made as to whether the wheel angle exceeds a threshold at operation 830. If the threshold for wheel angle is exceeded, flow may return to operation 800 for reevaluation with respect to positioning of the dive planes. However, if the threshold for wheel angle is not exceeded, then the vehicle may be assumed to be operating in neither a high braking situation nor a cornering situation, and the dive planes may be retracted at operation 430. In some cases, operation 830 may include a check both of speed and wheel angle to ensure that the vehicle is driving on a straight away before retracting the dive planes. Notably, the dive planes may be controlled simultaneously and in the same way (i.e., moving together by the same amount in the same direction), or the dive planes can be controlled independent of each other (i.e., capable of moving in different directions and/or different amounts).

Figure 9:
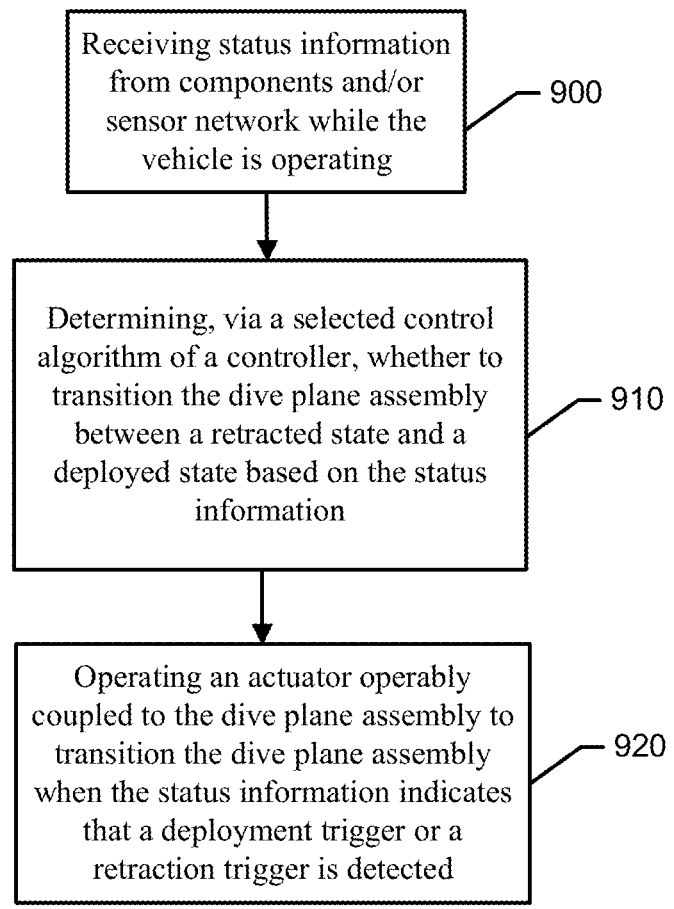
FIG. 9 illustrates a block diagram of a method of providing vehicle stability control to a vehicle having a dive plane assembly disposed on the vehicle in accordance with an example embodiment.

FIG. 9 illustrates a block diagram of a method of providing vehicle stability control to a vehicle having a dive plane assembly disposed on the vehicle is provided. The method may include receiving status information from components or a sensor network of the vehicle while the vehicle is operating at operation 900. The method may further include determining, via a selected control algorithm of a controller, whether to transition the dive plane assembly between a retracted state and a deployed state based on the status information at operation 910, and operating an actuator operably coupled to the dive plane assembly to transition the dive plane assembly when the status information indicates that a deployment trigger or a retraction trigger is detected at operation 920.

An aerodynamics control system for a vehicle may therefore be provided in accordance with some example embodiments. The system may include a dive plane assembly operably coupled to a front portion of a vehicle body, an actuator assembly operable to transition the dive plane assembly between a deployed state and a retracted state, and a controller operably coupled to the actuator to provide automatic control of the dive plane assembly via the actuator based on a selectable control mode. The selectable control mode defines a position of the dive plane assembly based on vehicle parameters measured while driving the vehicle.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the dive plane assembly may include a first dive plane operably coupled to a first external surface of a front portion of a vehicle body, and a second dive plane operably coupled to a second external surface of the front portion of the vehicle body. In the deployed state, the first and second dive planes extend away from respective first and second external surfaces of the vehicle body by a selected amount to increase drag on the vehicle. In the retracted state, the first and second dive planes are retracted with respect to the respective first and second external edges of the vehicle body to reduce drag on the vehicle. In an example embodiment, the actuator may operate to extend the first dive plane or the second dive plane linearly from a first position inside the first or second external surface, respectively, to a second position outside the first or second external surface, respectively. In some cases, the actuator may operate to rotate the first dive plane or the second dive plane from a first position substantially conformal with the first or second external surface, respectively, to a second position extended away from the first or second external surface, respectively. In an example embodiment, the first and second external surfaces may be class A surfaces proximate to a headlight or signal light of the vehicle. In some cases, the actuator may be operable based on input from a controller, and the controller may receive status information defining the vehicle parameters from a sensor network of the vehicle in real time while the vehicle is driving, and enable selection of a first mode in which the dive plane assembly is retained in the retracted state, and a second mode in which the controller modifies transitioning of the dive plane assembly between the deployed state and the retracted state based on the status information. In an example embodiment, the dive plane assembly may include a first dive plane and a second dive plane, and the transitioning of the dive plane assembly to the deployed state may include defining an angle of attack for the first and second dive planes, respectively. In some cases, the angle of attack for the first and second dive planes may be calculated independently of each other. In an example embodiment, the status information may include latitude/longitude acceleration, pitch, yaw, pitch rate, yaw rate, lateral G force, throttle position, wheel angle, wheel angle request, brake torque, brake torque request, aerodynamic load on the first or second dive planes, or selector button position. In some cases, the status information may include a brake torque request, vehicle speed and wheel angle. In an example embodiment, the controller may extend the dive plane assembly to a first position responsive to the brake torque request exceeding a first threshold, and extend the dive plane assembly to a second position responsive to the brake torque request being below the first threshold. The controller may retract the dive plane assembly responsive to the wheel angle being below a second threshold while the vehicle speed is above a third threshold. In some cases, the controller may extend the dive plane assembly to the deployed state based on a deployment trigger that is a braking trigger, and the controller may determine, based on a brake pressure request, whether the braking trigger is met. In an example embodiment, the controller may extend the dive plane assembly to the deployed state based on a deployment trigger that is a turning trigger, and the controller may determine, based on a wheel angle of the vehicle, whether the turning trigger is met.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An aerodynamics control system for a vehicle, the system comprising:
   a dive plane assembly operably coupled to a front portion of a vehicle body;
   an actuator assembly operable by a driver of the vehicle while driving to transition the dive plane assembly between a deployed state and a retracted state; and
   a controller operably coupled to the actuator to provide automatic control of the dive plane assembly via the actuator based on a selectable control mode,
   wherein the selectable control mode defines a position of the dive plane assembly based on measured vehicle parameters.

2. The system of claim 1, wherein the dive plane assembly comprises:
   a first dive plane operably coupled to a first external surface of a front portion of a vehicle body; and
   a second dive plane operably coupled to a second external surface of the front portion of the vehicle body,
   wherein, in the deployed state, the first and second dive planes extend away from respective first and second external surfaces of the vehicle body by a selected amount to increase drag on the vehicle, and
   wherein, in the retracted state, the first and second dive planes are retracted with respect to the respective first and second external edges of the vehicle body to reduce drag on the vehicle.

3. The system of claim 2, wherein the actuator operates to extend the first dive plane or the second dive plane linearly from a first position inside the first or second external surface, respectively, to a second position outside the first or second external surface, respectively.

4. The system of claim 2, wherein the actuator operates to rotate the first dive plane or the second dive plane from a first position substantially conformal with the first or second external surface, respectively, to a second position extended away from the first or second external surface, respectively.

5. The system of claim 2, wherein the first and second external surfaces are class A surfaces proximate to a headlight or signal light of the vehicle.

6. The system of claim 1, wherein the actuator is operable based on input from a controller,
   wherein the controller receives status information defining the vehicle parameters from a sensor network of the vehicle in real time while the vehicle is driving, and
   wherein the controller enables selection of a first mode in which the dive plane assembly is retained in the retracted state, and a second mode in which the controller modifies transitioning of the dive plane assembly between the deployed state and the retracted state based on the status information.

7. The system of claim 6, wherein the dive plane assembly comprises a first dive plane and a second dive plane, and
   wherein the transitioning of the dive plane assembly to the deployed state comprises defining an angle of attack for the first and second dive planes, respectively.

8. The system of claim 7, wherein the angle of attack for the first and second dive planes are calculated independently of each other.

9. The system of claim 6, wherein the status information includes latitude/longitude acceleration, pitch, yaw, pitch rate, yaw rate, lateral G force, throttle position, wheel angle, wheel angle request, brake torque, brake torque request, aerodynamic load on the first or second dive planes, or selector button position.

10. The system of claim 6, wherein the status information includes a brake torque request, vehicle speed and wheel angle.

11. The system of claim 10, wherein the controller extends the dive plane assembly to a first position responsive to the brake torque request exceeding a first threshold, and extends the dive plane assembly to a second position responsive to the brake torque request being below the first threshold, and
   wherein the controller retracts the dive plane assembly responsive to the wheel angle being below a second threshold while the vehicle speed is above a third threshold.

12. The system of claim 1, wherein the controller extends the dive plane assembly to the deployed state based on a deployment trigger,
   wherein the deployment trigger comprises a braking trigger, and
   wherein the controller determines, based on a brake pressure request whether the braking trigger is met.

13. The system of claim 1, wherein the controller extends the dive plane assembly to the deployed state based on a deployment trigger,
   wherein the deployment trigger comprises a turning trigger, and
   wherein the controller determines, based on a wheel angle of the vehicle, whether the turning trigger is met.

14. A method of providing vehicle stability control to a vehicle having a dive plane assembly disposed on an external surface of the vehicle, the method comprising:
   receiving status information from components or a sensor network of the vehicle while the vehicle is operating;
   determining, via a selected control algorithm of a controller, whether to transition the dive plane assembly between a retracted state and a deployed state based on the status information; and
   operating an actuator operably coupled to the dive plane assembly to transition the dive plane assembly when the status information indicates that a deployment trigger or a retraction trigger is detected.

15. The method of claim 14, wherein the deployment trigger comprises a braking trigger, and
   wherein the controller determines, based on a brake pressure request whether the braking trigger is met.

16. The method of claim 14, wherein the deployment trigger comprises a turning trigger, and
   wherein the controller determines, based on a wheel angle of the vehicle, whether the turning trigger is met.

17. The method of claim 14, wherein the dive plane assembly comprises a first dive plane and a second dive plane, and
   wherein the transitioning of the dive plane assembly to the deployed state comprises defining an angle of attack for the first and second dive planes, respectively.

18. The method of claim 17, wherein the angle of attack for the first and second dive planes are calculated independently of each other.

19. The method of claim 14, wherein the controller instructs the actuator to extend the dive plane assembly to a first position responsive to a brake torque request exceeding a first threshold, and extend the dive plane assembly to a second position responsive to the brake torque request being below the first threshold, and wherein the controller instructs the actuator to retract the dive plane assembly responsive to a wheel angle being below a second threshold while vehicle speed is above a third threshold.

20. The method of claim 14, wherein the selected control algorithm is one of a plurality of control algorithms that each define a corresponding different level of intensity for defining an angle of attack of the dive plane assembly.

* * * * *